US012474658B2

(12) United States Patent
Sakaguchi et al.

(10) Patent No.: US 12,474,658 B2
(45) Date of Patent: Nov. 18, 2025

(54) IMAGE FORMING APPARATUS THAT CONTROLS OF RECEIVING AND NOT RECEIVING VOICE INSTRUCTION IN VOICE INPUT POSSIBLE MODE

(71) Applicant: KYOCERA Document Solutions Inc., Osaka (JP)

(72) Inventors: Shoichi Sakaguchi, Osaka (JP); Fumiya Sakashita, Osaka (JP); Junpei Takada, Osaka (JP); Yumi Hirobe, Osaka (JP); Takuma Fujikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/705,168

(22) PCT Filed: Jul. 20, 2023

(86) PCT No.: PCT/JP2023/026677
§ 371 (c)(1),
(2) Date: Apr. 26, 2024

(87) PCT Pub. No.: WO2024/024643
PCT Pub. Date: Feb. 1, 2024

(65) Prior Publication Data

US 2025/0028268 A1 Jan. 23, 2025

(30) Foreign Application Priority Data

Jul. 29, 2022 (JP) ................................ 2022-121285

(51) Int. Cl.
*G03G 15/00* (2006.01)
*G03G 21/16* (2006.01)

(52) U.S. Cl.
CPC ......... *G03G 15/5016* (2013.01); *G03G 15/50* (2013.01); *G03G 15/502* (2013.01);
(Continued)

(58) Field of Classification Search
CPC .. G03G 15/50; G03G 15/5016; G03G 15/502; G03G 21/1614; G03G 2215/00122
See application file for complete search history.

(56) References Cited

U.S. PATENT DOCUMENTS

2007/0061150 A1 3/2007 Sawano et al.
2016/0205286 A1 7/2016 Kanai et al.
(Continued)

FOREIGN PATENT DOCUMENTS

JP 2007079852 A 3/2007
JP 2007333778 A 12/2007
(Continued)

*Primary Examiner* — Joseph S Wong
(74) *Attorney, Agent, or Firm* — IP Business Solutions, LLC.

(57) ABSTRACT

An image forming apparatus includes: a receiver that receives a manual input instruction via an operation device and a voice instruction via a microphone; and a controller that executes a job on the basis of setting received by the receiver. The controller performs switching between a manual input dedicated mode in which only a manual input instruction is received by the receiver and a voice input possible mode in which a voice input and a manual input instruction are received by the receiver, and when an operation screen for receiving an input of information, an input of which through a voice instruction is prohibited in advance, is displayed on a display device by a display controller, the controller performs switching to the manual input dedicated mode.

5 Claims, 11 Drawing Sheets

(52) U.S. Cl.
CPC .................. *G03G 21/1614* (2013.01); *G03G 2215/00122* (2013.01)

(56) References Cited

U.S. PATENT DOCUMENTS

| | | | | |
|---|---|---|---|---|
| 2019/0362708 | A1 | 11/2019 | Kitaguchi | |
| 2020/0193991 | A1 * | 6/2020 | Saito | G06F 3/167 |
| 2020/0195805 | A1 * | 6/2020 | Matsubara | H04N 1/00896 |

FOREIGN PATENT DOCUMENTS

| | | | |
|---|---|---|---|
| JP | 2014196847 | A | 10/2014 |
| JP | 2016126704 | A | 7/2016 |
| JP | 2019205052 | A | 11/2019 |
| JP | 2020098383 | A | 6/2020 |

* cited by examiner

IMAGE FORMING APPARATUS THAT CONTROLS OF RECEIVING AND NOT RECEIVING VOICE INSTRUCTION IN VOICE INPUT POSSIBLE MODE

TECHNICAL FIELD

The present invention relates to an image forming apparatus that allows voice instructions.

BACKGROUND ART

Some image forming apparatuses such as copy machines and multi-functional machines include operation panels for users to perform manual input operations. A user can select one function from among a plurality of functions (such as a copy function, a scanner function, and a facsimile function, for example) and perform setting for the function by performing operations via the operation panels.

Also, various image forming apparatuses that allow voice instructions have been proposed and put into practical use. For example, Patent Literature 1 listed below describes that content of a voice instruction is reflected in job setting, and Patent Literature 2 listed below describes that job history information intended by a user is narrowed down from a plurality of pieces of job history information on the basis of a keyword included in user voice.

CITATION LIST

Patent Literature

[Patent Literature 1]

Japanese Unexamined Patent Application Publication No. 2020-098383

[Patent Literature 2]

Japanese Unexamined Patent Application Publication No. 2019-205052

SUMMARY OF INVENTION

However, content of utterance of a user is likely to he heard by the surroundings at the time of a voice input. Although there may be no problems if it is heard by the surroundings when the operation content is just selection of a function or setting, it is not preferable that the surroundings hear individual information such as a user ID and a password in terms of security. Moreover, there may also be a case where accuracy of an input is not guaranteed by a voice input and it is not possible to accurately input an instruction depending on content of the instruction. However, Patent Literatures 1 and 2 listed above do not disclose any means for solving the problem at the time of a voice input.

The present invention was made in view of the above circumstances, and an object thereof is to enable security and input accuracy when voice for a voice instruction is uttered and input to be secured.

An image forming apparatus according to an aspect of the present invention is an image forming apparatus that includes an image forming device that forms an image on a recording medium, the image forming apparatus including: a display device; a display controller that causes the display device to display an operation screen; an operation device that receives an input of a manual input instruction through a manual operation of a user; a voice input device that receives an input of voice from the user; a receiver that receives a voice instruction based on the voice input to the voice input device and the manual input instruction; and a controller that controls operations of the image forming apparatus and executes a job on the basis of the manual input instruction and the voice instruction received by the receiver, in which the controller performs switching between a manual input dedicated mode in which only the manual input instruction is received by the receiver and a voice input possible mode in which the voice instruction and the manual input instruction are received by the receiver, and when the operation screen for receiving an input of information, an input of which through the voice instruction is prohibited in advance, is displayed on the display device by the display controller, the controller performs switching to the manual input dedicated mode.

According to the present invention, it is possible to secure security and input accuracy when voice for a voice instruction is uttered and input.

DESCRIPTION OF EMBODIMENTS

Figure 1:
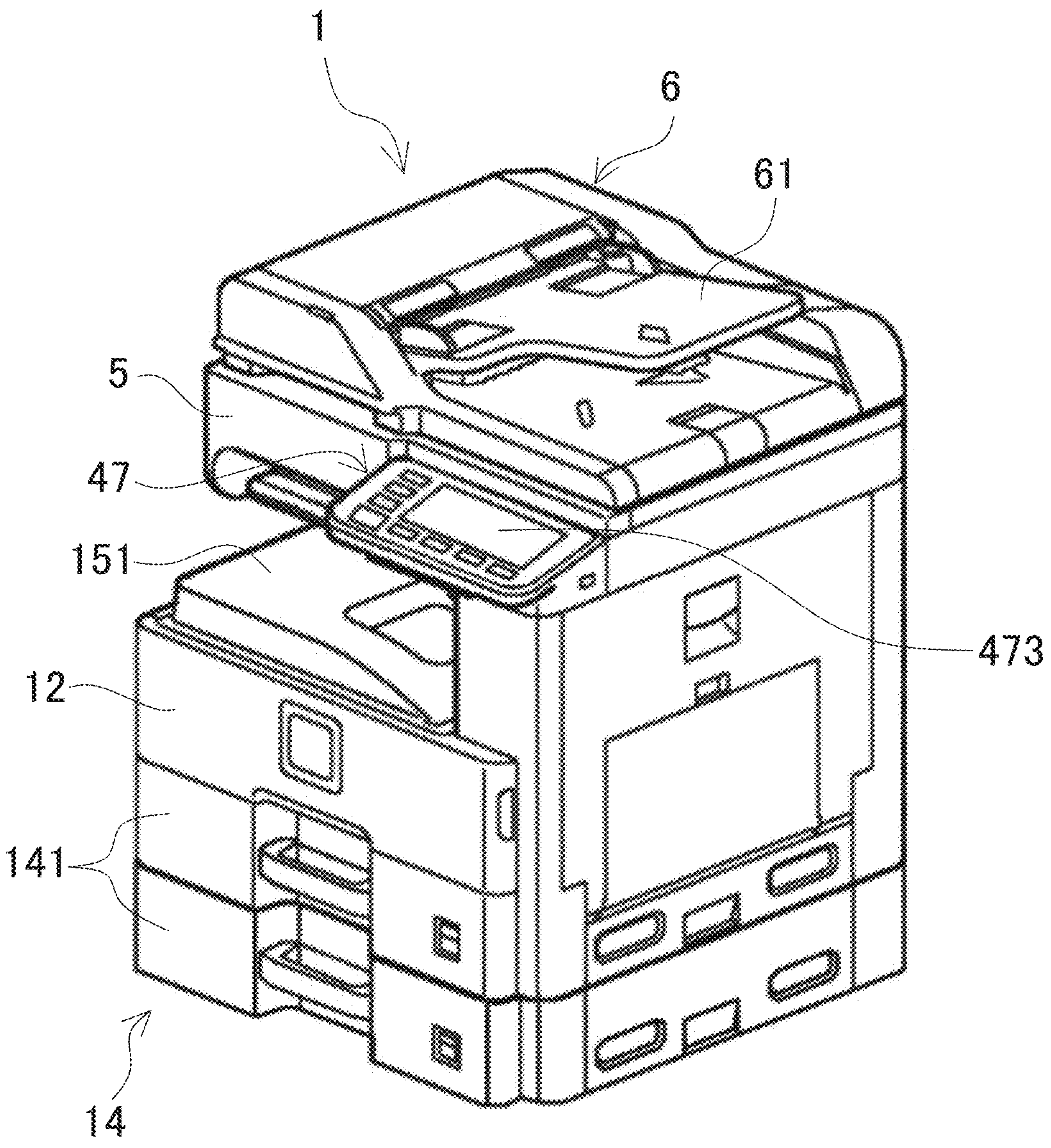
FIG. 1 is a perspective view illustrating the exterior of an image forming apparatus according to an embodiment of the present invention.
Figure 2:
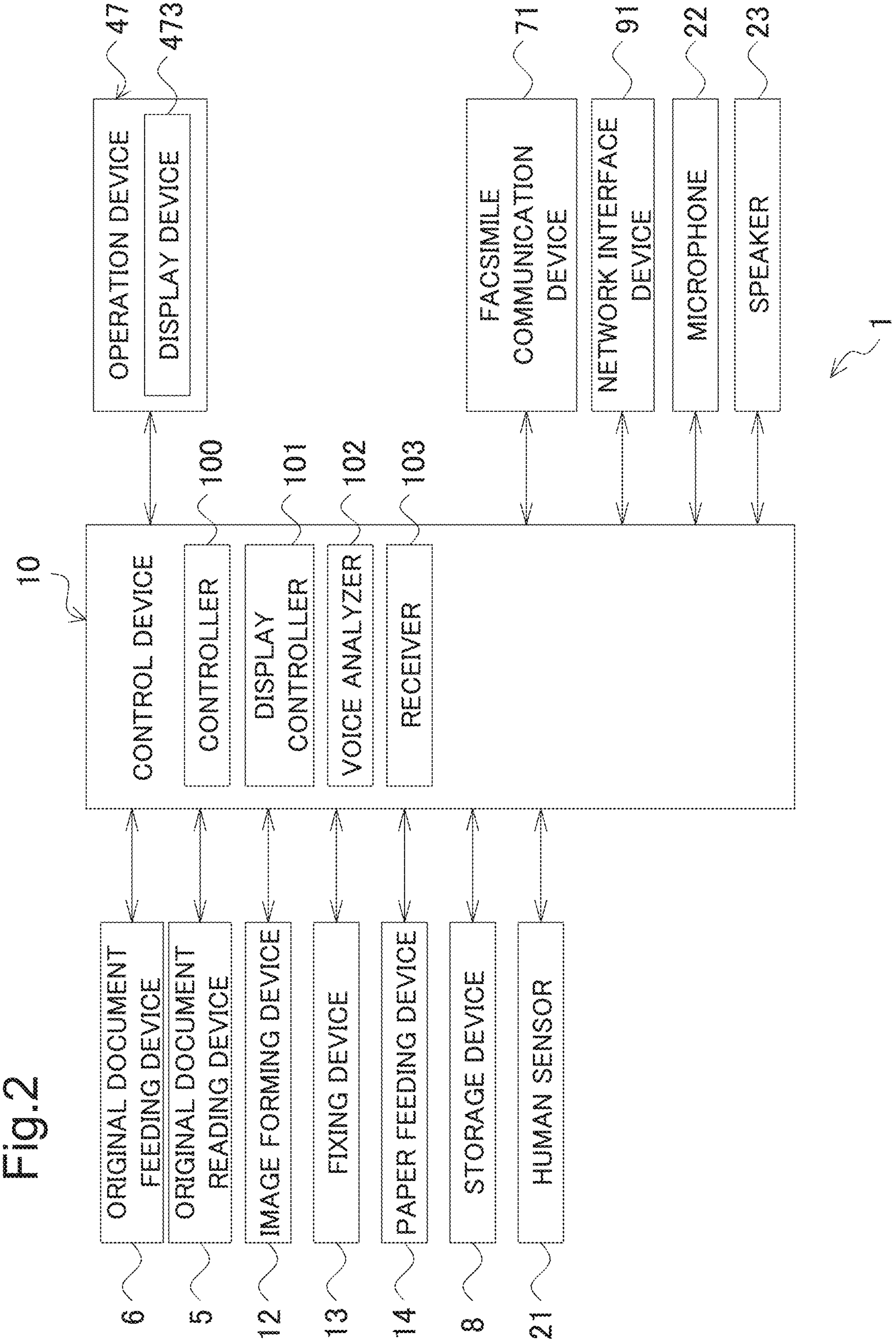
FIG. 2 is a functional block diagram schematically illustrating main internal configurations of the image forming apparatus.

Hereinafter, an image forming apparatus according to an embodiment of the present invention will be described with reference to the drawings. FIG. 1 is a perspective view illustrating the exterior of the image forming apparatus according to the embodiment of the present invention. FIG. 2 is a functional block diagram schematically illustrating main internal configurations of the image forming apparatus. An image forming apparatus 1 according to a first embodiment is a multi-function machine that is equipped with a plurality of functions such as a copy function, a printer function, a scanner function, and a facsimile function, for example, and is configured to include an original document feeding device 6, an original document reading device 5, an image forming device 12, a fixing device 13, a paper feeding device 14, a storage device 8, a human sensor 21, an operation device 47, a facsimile communication device 71, a network interface device 91, a microphone 22, and a speaker 23.

An original document feeding device 6 is configured on an upper surface of the original document reading device 5 such that the original document feeding device 6 can be opened and closed with a hinge, which is not illustrated, and the original document feeding device 6 functions as an original document pressing cover in a case where an original document placed on a platen glass, which is not illustrated, is read. Also, the original document feeding device 6 is called an auto document feeder (ADF) or a document processor (DP), includes an original document placement tray 61, and supplies an original document placed on the original document placement tray 61 one by one to the original document reading device 5.

A case where the image forming apparatus 1 performs an original document reading operation will be described. The original document reading device 5 optically reads an image in the original document supplied to the original document reading device 5 by the original document feeding device 6 or the original document placed on the platen glass and generates image data. The image data generated by the original document reading device 5 is saved in an image memory or the like, which is not illustrated.

A case where the image forming apparatus 1 performs an image forming operation will be described. The image forming device 12 forms a toner image on a recording paper as a recording medium supplied from the paper feeding device 14 on the basis of the image data generated by the original document reading operation or image data received from a computer as an external device (a personal computer, for example) connected via a network.

The fixing device 13 is adapted to heat and pressurize the recording paper with a toner image formed thereon by the image forming device 12 and fix the toner image on the recording paper, and the recording paper on which the fixation processing has been performed is discharged to a discharge tray 151. The paper feeding device 14 includes a plurality of paper supply cassettes 141.

The storage device 8 is a large-capacity storage device such as a hard disk drive (HDD) or a solid state drive (SSD) and stores various control programs and the like.

The human sensor 21 detects a person approaching the image forming apparatus 1. As the human sensor 21, a sensor that detects infrared rays emitted from a human body, for example, is used.

The operation device 47 receives instructions such as an image forming operation executing instruction from an operator in regard to various operations and processing that can be performed by the image forming apparatus 1. The operation device 47 includes a display device 473 that displays an operation guide and the like for the operator. Also, the operation device 47 receives inputs of instructions from a user on the basis of operations (touch operations) performed by the user on an operation screen displayed on the display device 473 via a touch panel included in the display device 473 and operations performed by the user on physical keys.

The display device 473 is configured of a liquid crystal display (LCD) or the like. The display device 473 includes a touch panel. Once the operator performs an operation of touching a button or a key displayed on the screen, an instruction corresponding to the position where the touch operation has been performed is received by the touch panel.

The facsimile communication device 71 includes encoding/decoding and modulation/demodulation devices and a network control unit (NCU), which are not illustrated, and performs facsimile transmission/reception by using a public telephone network or the like.

The network interface device 91 is a communication interface that transmits/receives various kinds of data to and from the external device (a personal computer, for example) in a local area or on the Internet.

The microphone 22 collects sound in the surroundings of the image forming apparatus 1 and converts the sound into an electrical signal (voice data). Note that the microphone 22 is provided at an appropriate location where it is easy to collect voice of an utterance of the user, for example, in the operation device 47.

The speaker 23 outputs various kinds of voice such as operation sounds and effect sounds when the operation device 47 is operated, guidance voice for explaining an operation method, and an alert sound in a case where some trouble occurs in the image forming apparatus 1. For example, the speaker 23 is provided at a location where the speaker 23 is not visible from the outside of the image forming apparatus 1, for example, inside the operation device 47.

The control device 10 is configured to include a processor, a random access memory (RAM), a read only memory (ROM), and a dedicated hardware circuit. The processor is, for example, a central processing unit (CPU), an application specific integrated circuit (ASIC), or a micro processing unit (MPU). The control device 10 includes a controller 100, a display controller 101, a voice analyzer 102, and a receiver 103.

The control device 10 is adapted to function as the controller 100, the display controller 101, the voice analyzer 102, and the receiver 103 by operations of the processor in accordance with a control program stored in the storage device 8. However, each of the controller 100 and the like can also be configured by a hardware circuit without depending on operations in accordance with the control program of the control device 10. Hereinafter, the same applies to each embodiment unless otherwise particularly stated.

The controller 100 is in charge of overall operation control of the image forming apparatus 1. The controller 100 is connected to the original document feeding device 6, the original document reading device 5, the image forming device 12, the fixing device 13, the paper feeding device 14, the storage device 8, the human sensor 21, the operation device 47, the facsimile communication device 71, the network interface device 91, the microphone 22, and the speaker 23 and performs drive control and the like on each of these components. For example, the controller 100 controls operations of the image forming device 12 and the like and causes an original document image obtained by the original document reading device 5 through reading to be formed on recording paper as a recording medium.

Also, once an approaching person is detected by the human sensor 21, the controller 100 controls the microphone 22 to bring the microphone 22 into an ON state to enable a voice input to the microphone 22, and if a predefined time (30 seconds, for example) elapses after the approaching person is no longer detected by the human sensor 21, the controller 100 controls the microphone 22 and brings the microphone 22 into an OFF state. Note that the ON/OFF switching of the microphone 22 can also be performed by the controller 100 in accordance with an instruction input to the operation device 47.

The display controller 101 controls display of the display device 473. For example, the display controller 101 displays, on the display device 473, a selection screen for allowing the user to select a function to be executed from among the plurality of functions that can be executed by the image forming apparatus 1 and displays, on the display device 473, a setting screen for receiving an input related to setting for each function in a lower hierarchy than the selection screen.

Figure 3A:
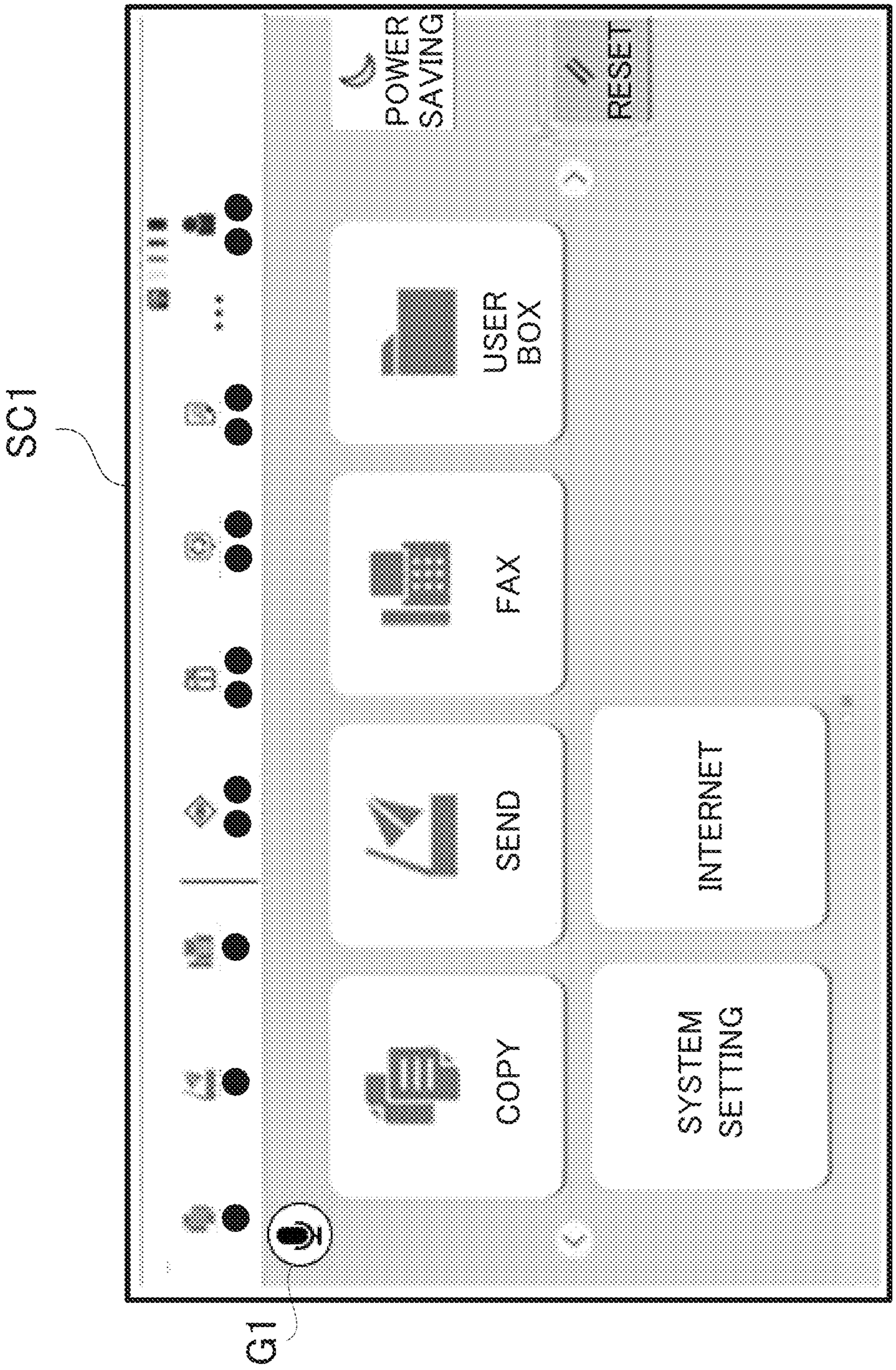
FIGS. 3A and 3B are diagrams illustrating an example of an operation screen displayed on a display device.
Figure 3B:
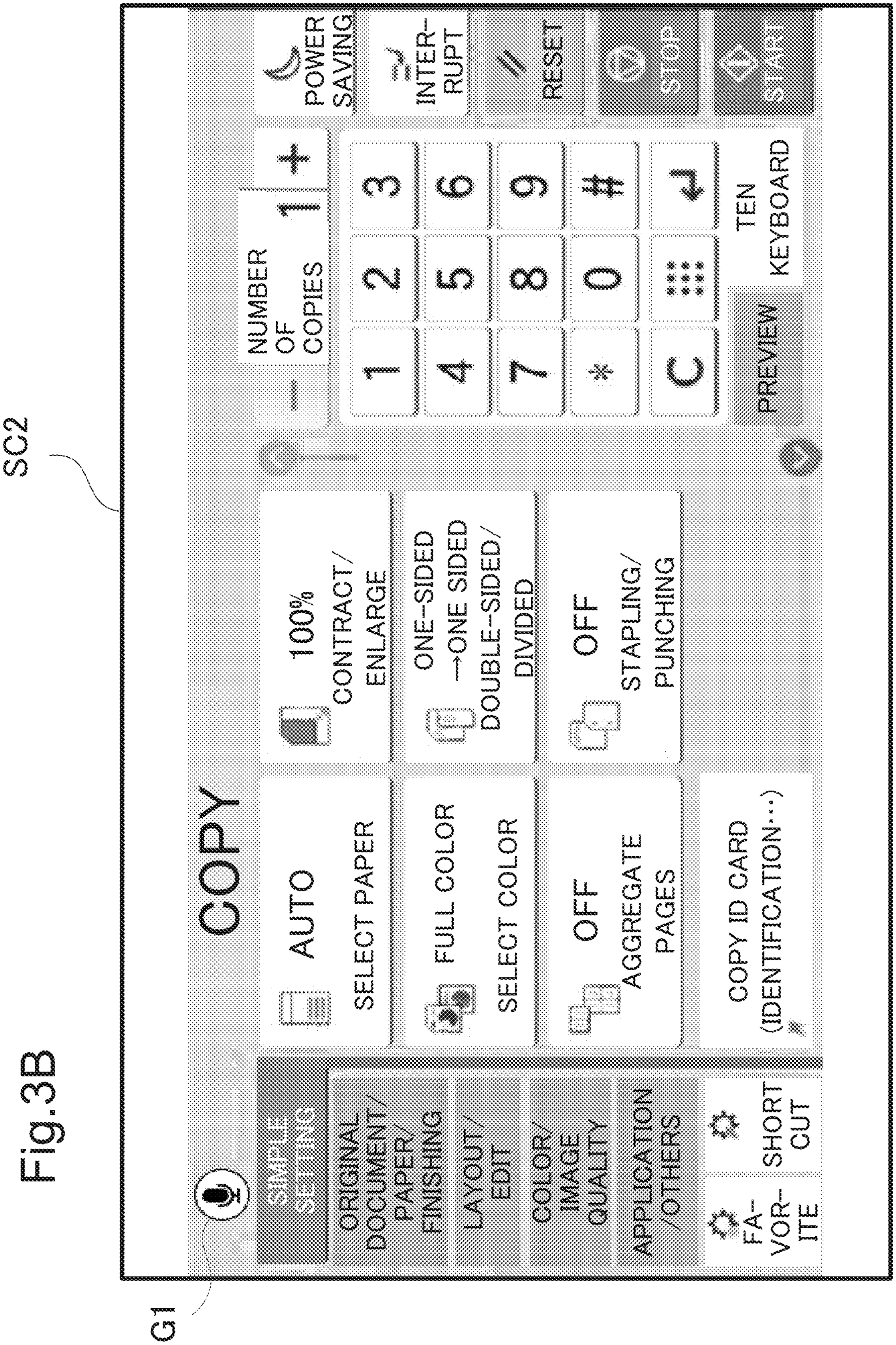

FIGS. 3A and 3B are diagrams illustrating examples of a screen displayed on the display device 473. An operation screen SC1 illustrated in FIG. 3A is a selection screen for allowing the user to select a function to be executed from among the plurality of functions that can be executed by the image forming apparatus 1. On the operation screen SC1, a "copy" button, a "send (scanner function)" button, a "fax (facsimile function)" button, and the like are displayed. Note that the operation screen SC1 of the above selection screen is also a "home" screen. Once the "copy" button is pressed by the user, the operation device 47 receives a copy function selection instruction, and the controller 100 causes the display device 473 to display an operation screen SC2 illustrated in FIG. 3B in response to the instruction.

The operation screen SC2 is displayed as a lower hierarchy than the "home" screen on the display device 473. The operation screen SC2 is a setting screen for receiving an input related to setting of the "copy" function. Six buttons with descriptions of "Select paper", "Select color", "Aggregate pages", "Contract/Enlarge", "Double-sided/Divided", and "Stapling/Punching" are displayed at the center of the setting screen for the "copy" function. These buttons are images for receiving settings related to the "copy" function.

A sign G1 for an illustration of microphone is displayed on the operation screen SC1 illustrated in FIG. 3A and the operation screen SC2 illustrated in FIG. 3B (the left upper portion in FIGS. 3A and 3B). The display of the sign G1 indicates that it is possible to input voice to the microphone 22 in the state. In other words, the controller 100 turns on the microphone 22 and causes the operation screen SC2 to display the sign G1 when the microphone 22 is in the state where a voice input is possible.

Figure 4A:
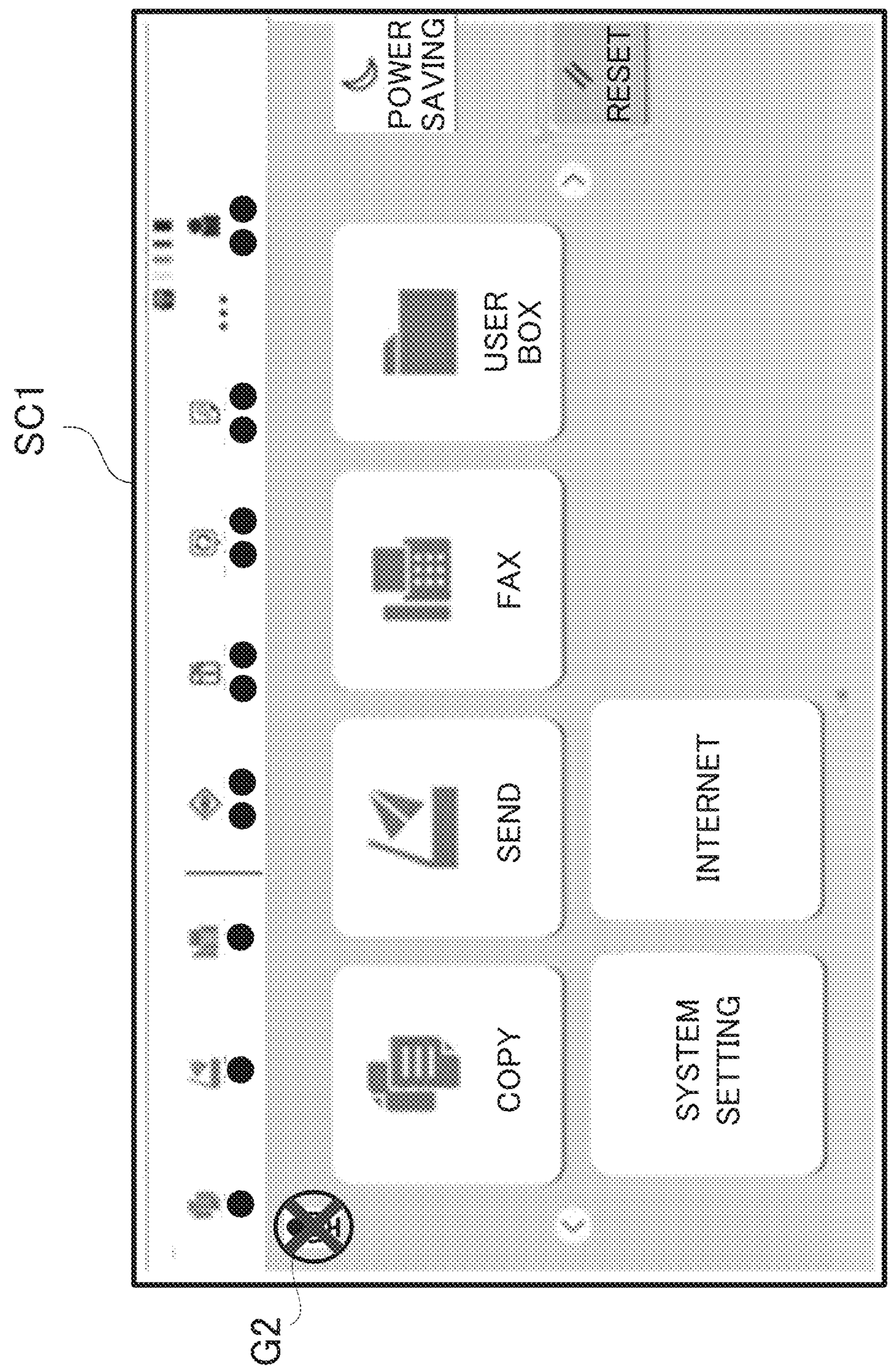
FIGS. 4A and 4B are diagrams illustrating an example of the operation screen displayed on the display device.
Figure 4B:
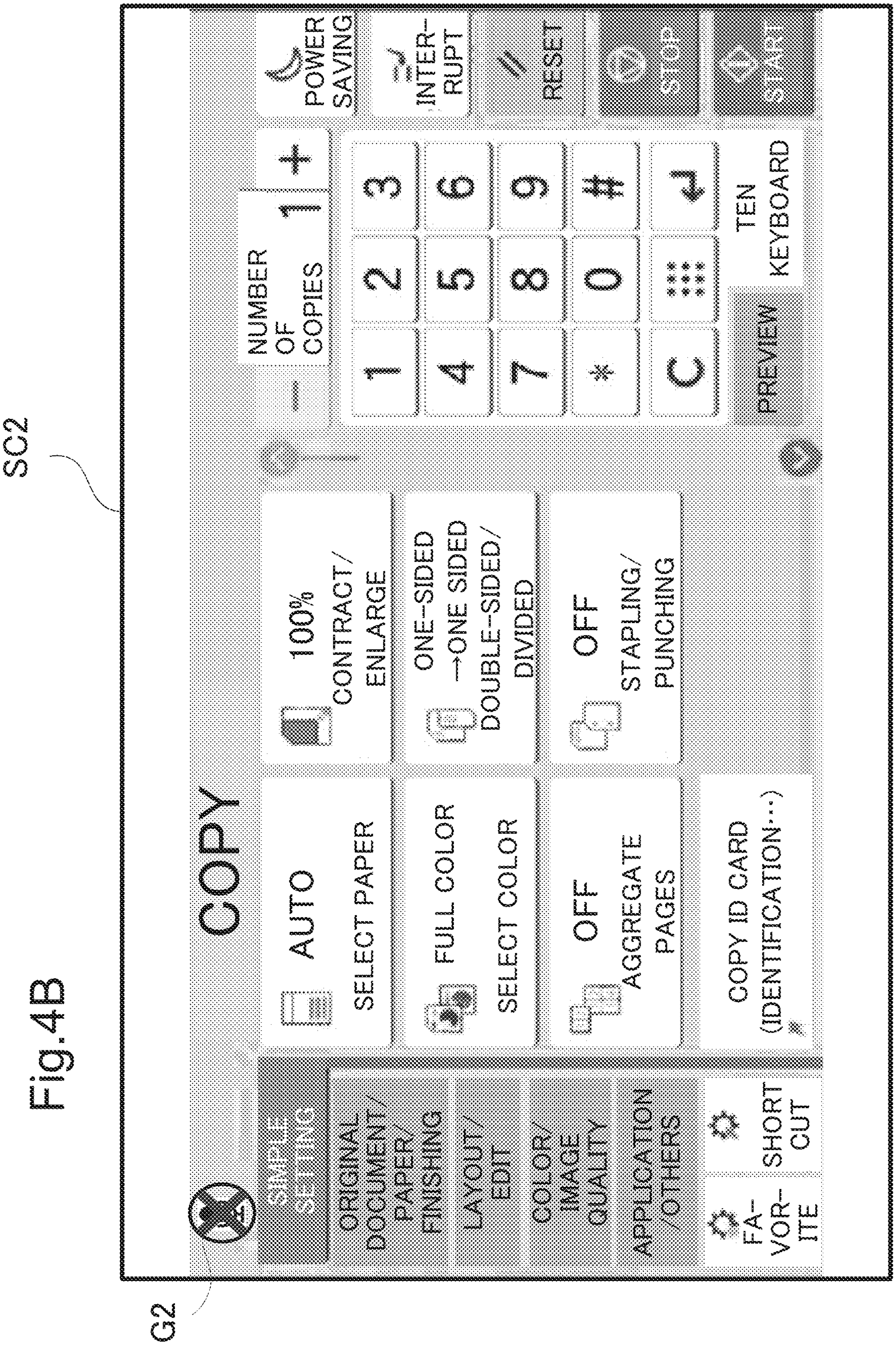
Figure 5:
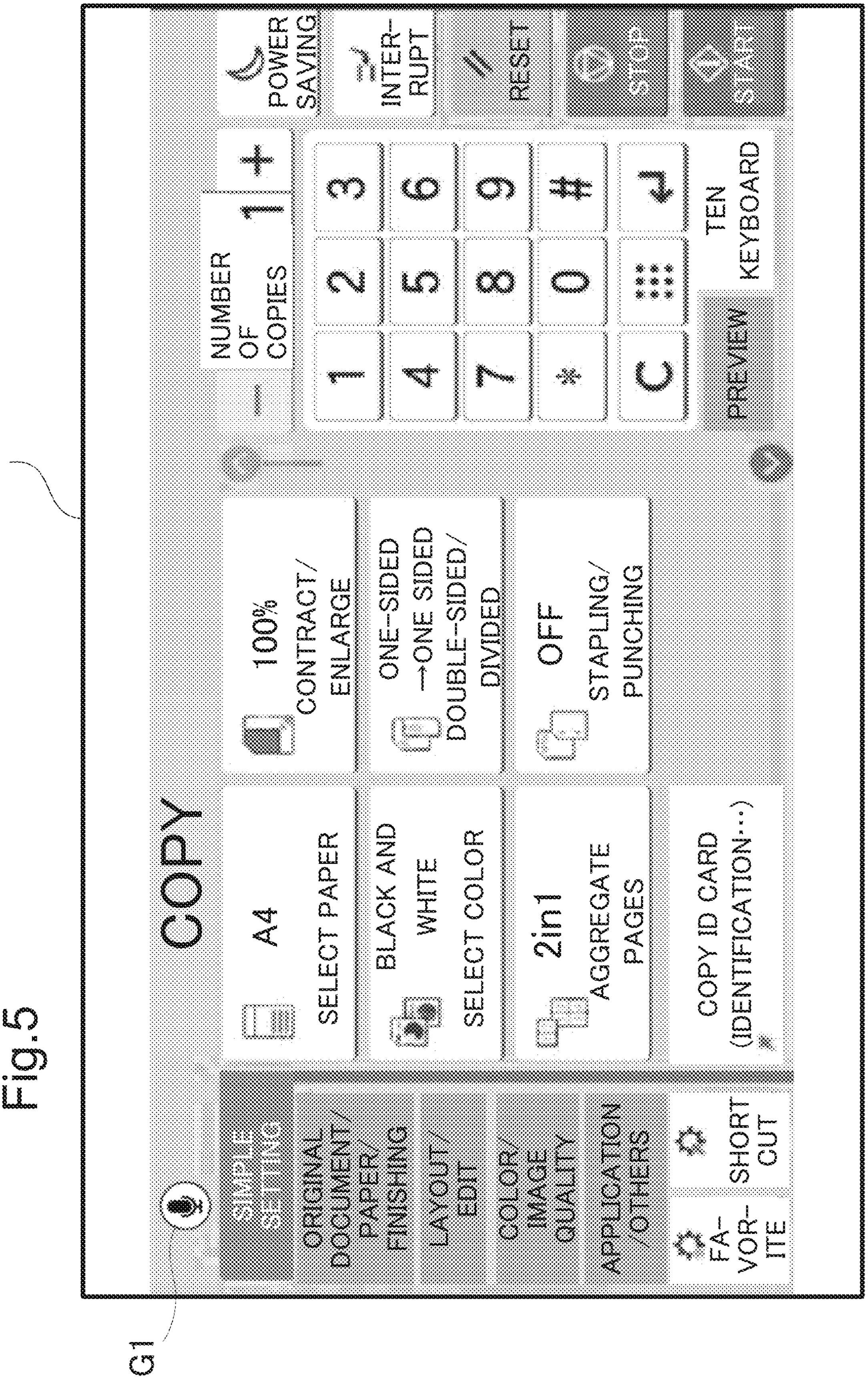
FIG. 5 is a diagram illustrating an example of the operation screen displayed on the display device.

On the other hand, when the controller 100 turns off the microphone 22 and brings the microphone 22 into a state where a voice input is not possible, a sign G2 for an illustration of an image "x" superimposed on the sign G1 of the microphone is displayed on the operation screen SC1 and the operation screen SC2 (the left upper portion in FIGS. 3A and 3B) as in the example illustrated in FIG. 4A and FIG. 4B.

The voice analyzer 102 converts the electrical signal (voice data) converted by the microphone 22 into text data by using an existing voice recognition technique, analyzes the text data by using an existing natural language processing technique, and thereby recognizes the voice instruction from the user.

The receiver 103 receives, as instructions from the user, the instruction input by a manual input operation via the operation device 47 (including a touch panel) on the screen that is currently displayed on the display device 473 and the voice instruction (an analysis result of the voice analyzer 102) recognized by the voice analyzer 102 via the microphone 22. The controller 100 executes a job in accordance with content of the instructions received by the receiver 103.

The display controller 101 displays, on the display device 473, a setting screen displaying content indicated by the instruction input by a manual input operation or the above voice instruction. For example, when the operation screen SC2 of the setting screen illustrated in FIG. 3B is displayed on the display device 473, the user inputs instructions to set "Select paper" to "A4", "Select color" to "Black and white", and "Aggregate pages" to "2 in 1" via the operation device 47, and the receiver 103 receives the instructions. At this time, the display controller 101 displays, on the display device 473, the operation screen SC2 (setting screen) that displays, in a switched manner, the setting for "Select paper" from "Auto" to "A4", the setting for "Select color" from "Full color" to "Black and white", and the setting for "Aggregate pages" from "Off" to "2 in 1" as illustrated in 5.

Figure 6:
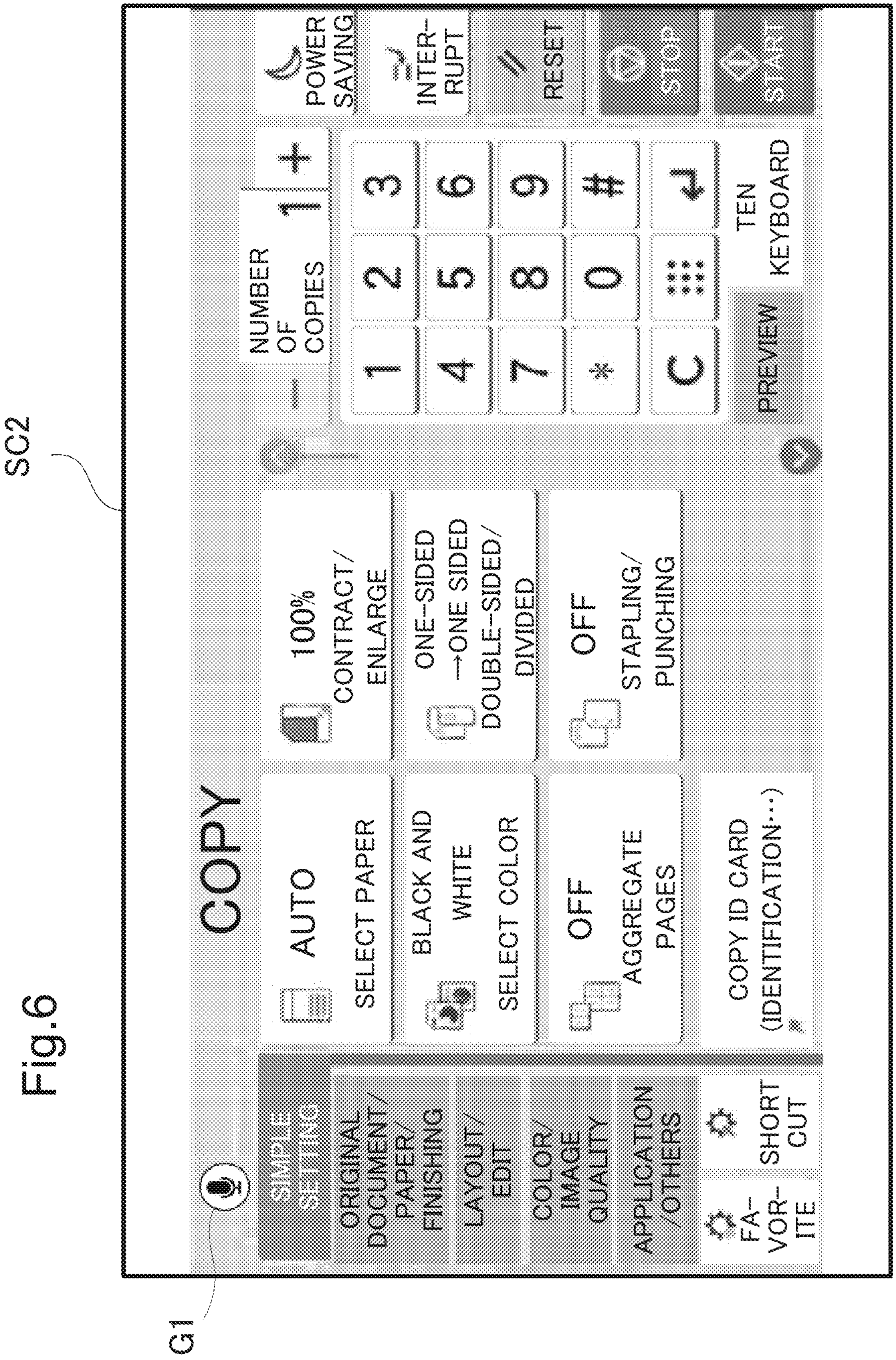
FIG. 6 is a diagram illustrating an example of the operation screen displayed on the display device.

If the user utters the keyword "black and white copy when the operation screen SC1 illustrated in FIG. 3A is displayed on the display device 473, and the receiver 103 receives the voice instruction via the speaker 23 and the voice analyzer 102, the display controller 101 displays the operation screen SC2 as illustrated in FIG. 6 on the display device 473.

The controller 100 performs switching between a manual input dedicated mode in which only a manual input instruction input through an operation of the operation device 47 is received by the receiver 103 and a voice input possible mode in which the voice instruction and the manual input instruction are received by the receiver 103. Here, a method in which the controller 100 sets the manual input dedicated mode not to allow the receiver 103 to receive a voice instruction may be either (i) a method of turning off the microphone 22 such that only the manual input instruction is received by the receiver 103 or (ii) a method of not allowing the receiver 103 to receive a voice instruction obtained by the microphone 22 in an ON state by receiving an input of voice and by the voice analyzer 102 analyzing the voice. When the operation screen for receiving an input of information, an input of which through a voice instruction is prohibited in advance is displayed on the display device 473 by the display controller 101, the controller 100 performs switching to the manual input dedicated mode. The above information, an input of which through a voice instruction is prohibited in advance is, for example, predefined voice input prohibited information such as taboo word content (such as a user ID or a password, for example), leakage of which is not favorable, and/or instruction content, depending on which input accuracy cannot be guaranteed by a voice input and it is not possible to input an accurate instruction (such as a mail address that is an email transmission destination or an IP address that is a data transmission destination, for example). The above information, an input of which through a voice instruction is prohibited in advance will be referred to as voice input prohibited information below.

When the voice input possible mode has been switched to, the display controller 101 causes an image or a message indicating that a voice instruction can be received to be displayed on the operation screen that the display device 473 is caused to display. On the other hand, when the manual input dedicated mode has been switched to, the display controller 101 causes an image or a message indicating that a voice instruction cannot be received to be displayed on the operation screen that the display device 473 is caused to display.

Figure 7:
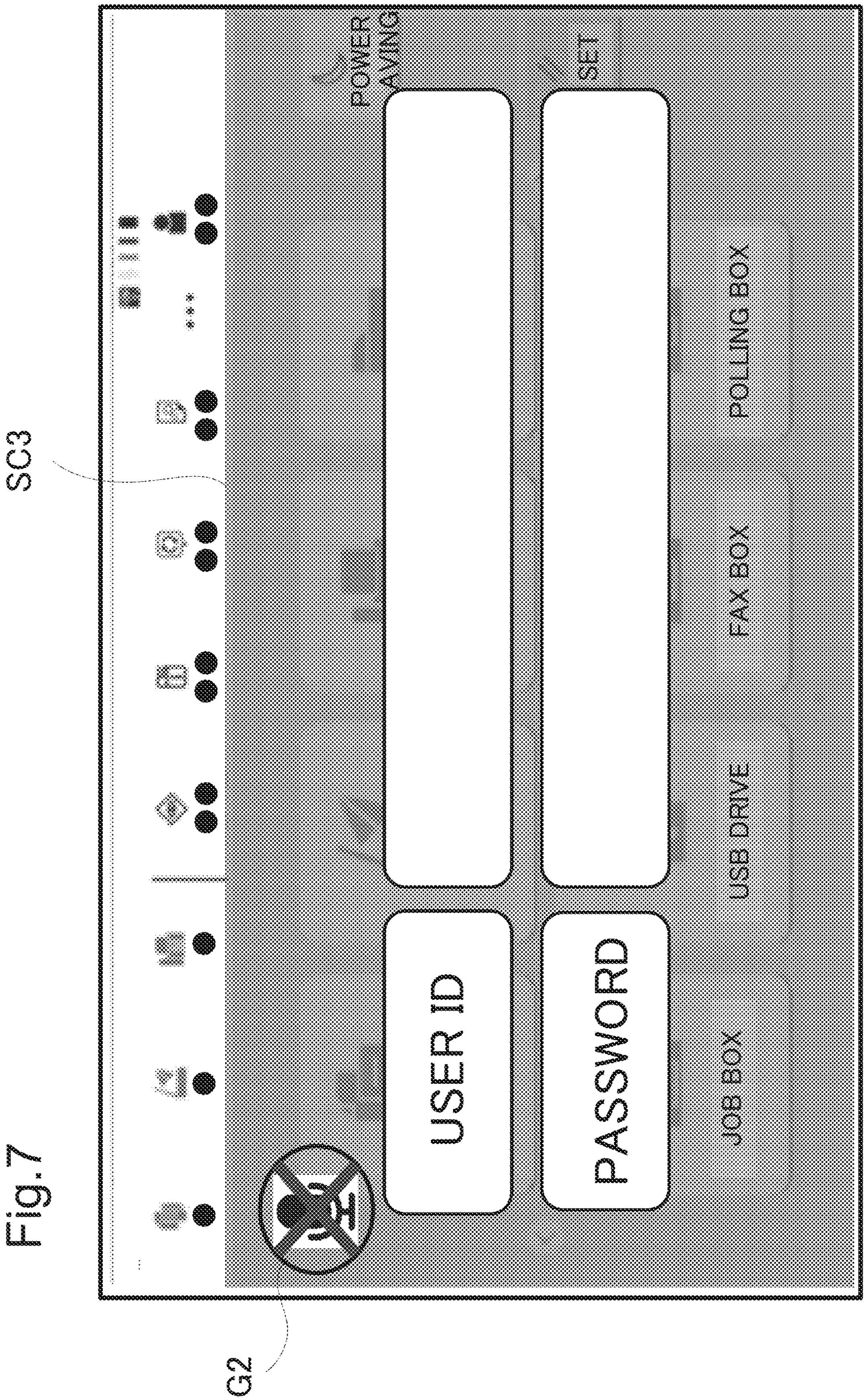
FIG. 7 is a diagram illustrating an example of the operation screen displayed on the display device.

As in the example illustrated in FIG. 7, when an authentication screen SC3 that requests inputs of a user ID and a password is displayed on the display device 473, the controller 100 switches the operation mode of the image forming apparatus 1 to the manual input dedicated mode to achieve a state in which the receiver 103 does not receive voice instructions for the user ID and the password and receives only manual input operations. Also, the display controller 101 displays the sign G2 "x" superimposed on the illustration of the microphone indicating that a voice instruction is not received for these operation targets on the authentication screen SC3. Cases where the authentication screen SC3 is displayed include a case where system setting is performed as well as at the time of log-in. Also, in a case where private printing is performed, an input of a password is required, and a similar authentication screen SC3 is displayed in this case as well.

Figure 8:
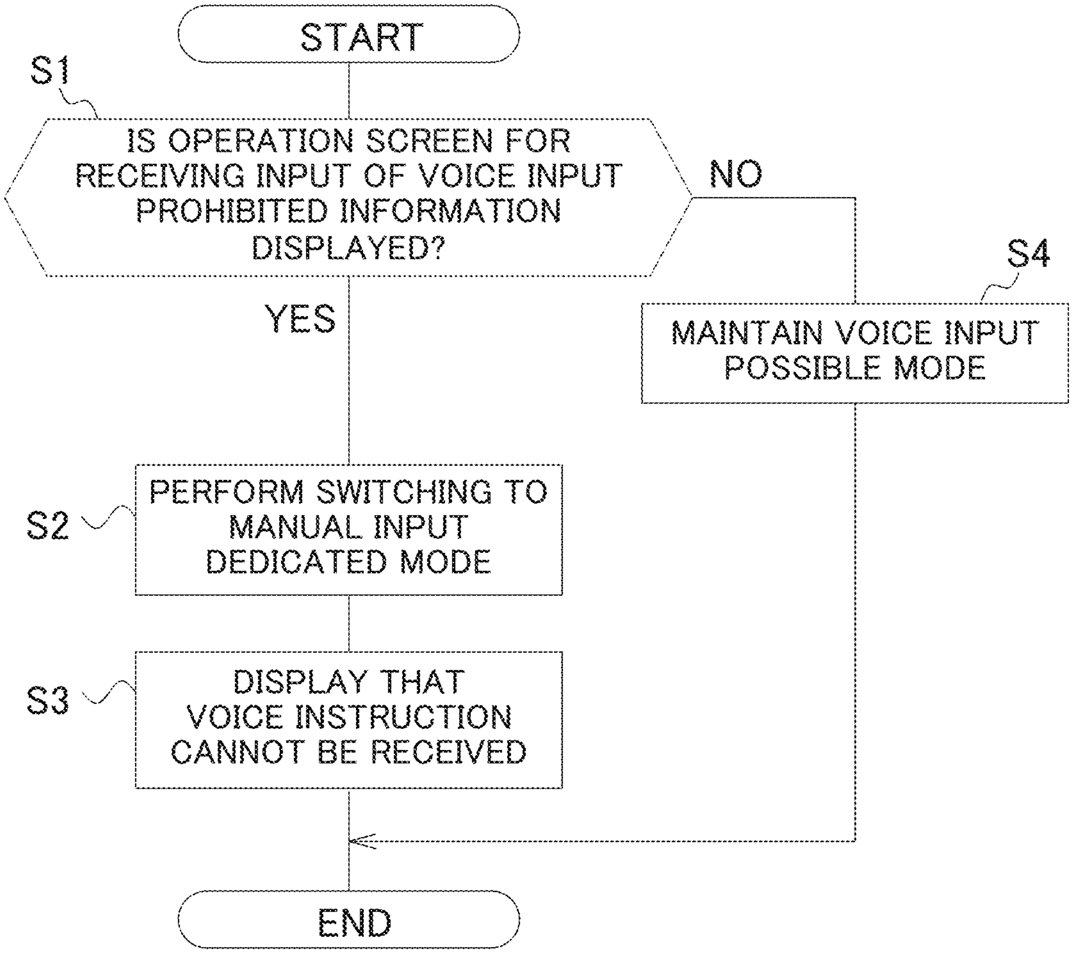
FIG. 8 is a flowchart illustrating an example of processing performed by a control device in the image forming apparatus.

Next, an example of processing performed by the control device 10 of the image forming apparatus 1 will be described on the basis of the flowchart illustrated in FIG. 8. Note that the processing is processing when switching of the operation screen to be displayed on the display device 473 occurs. Note that as initial setting, the controller 100 switches the operation mode of the image forming apparatus 1 to the voice input possible mode.

When the operation screen of the display device 473 is switched by the display controller 101, the controller 100 determines whether the operation screen after the switching is an operation screen for receiving an input of the above voice input prohibited information (S1).

Here, when it is determined that the operation screen after switching is the operation screen for receiving an input of the above voice input prohibited information (S1 "Yes"), the controller 100 switches the operation mode of the image forming apparatus 1 to the manual input dedicated mode (S2) to achieve a state where the receiver 103 does not receive voice instructions for the user ID and the password and receives only manual input operations.

At this time, the display controller 101 causes an image or a message indicating that a voice instruction cannot be received to be displayed on the operation screen as in the example illustrated in FIG. 7 (S3).

On the other hand, when it is determined that the operation screen after switching is not the operation screen for receiving an input of the above voice input prohibited information (S1 "No"), the controller 100 keeps the voice input possible mode as the operation mode of the image forming apparatus 1 (S4). The processing is then ended.

In this manner, according to the above embodiment, since the receiver 103 does not receive a voice instruction and receives only a manual input instruction when the operation screen for receiving an input of the above voice input prohibited information, for example, private information (confidential information) such as a user ID or a password, is displayed on the display device 473, the user does not utter individual information such as the user ID or the password, and it is possible to prevent leakage of the confidential information and to secure security. Also, since the receiver 103 does not receive a voice instruction and receives only a manual input instruction when the operation screen for receiving, as the above voice input prohibited information, data transmission counterpart information such as a mail address that is an e-mail transmission destination and an IP address that is a data transmission destination is displayed on the display device 473 as well, the user manually operates the operation device 47 and inputs the counterpart information, accuracy of the input of the counterpart information (instruction content) is guaranteed, and it is possible to accurately input the information (instruction).

Also, a further embodiment will be described. The display controller 101 may cause both an input item for which a voice instruction is received and an input item for which only a manual input instruction is received to be displayed on the operation screen of the display device 473 (the operation screen SC1 illustrated in FIG. 3A, for example). When the display device 473 is caused to display such an operation screen, the display controller 101 causes an image or a message indicating that a voice input is not received to be additionally displayed for the input item for which only a manual input instruction is received.

Figure 9:
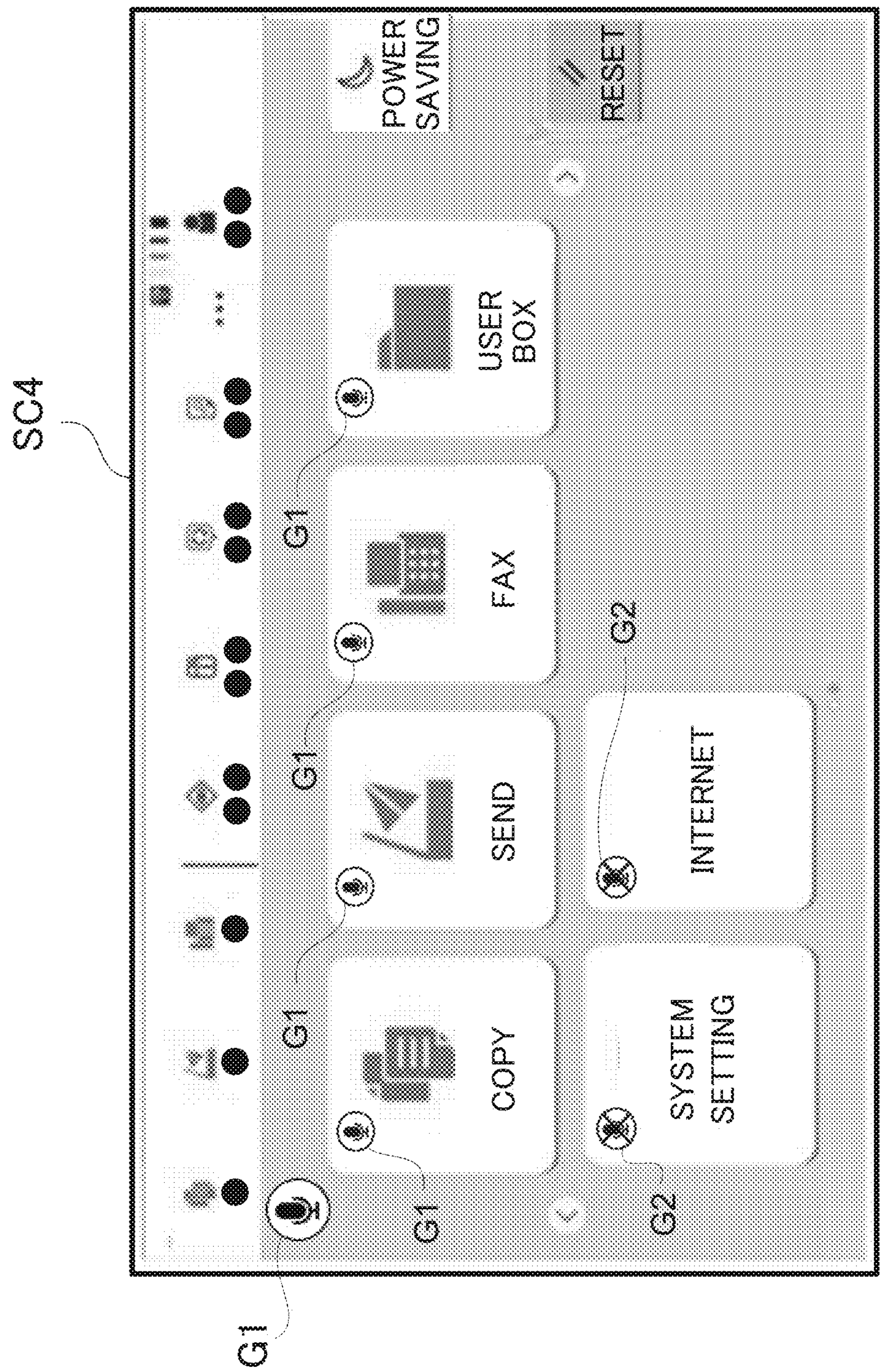
FIG. 9 is a diagram illustrating an example of the operation screen displayed on the display device.

As an example illustrated as an operation screen SC4 in FIG. 9, for example, the display controller 101 causes the sign G1 of the illustration of the microphone to be displayed on buttons for "Copy", "Send", "Fax", and "User box" for which a voice instruction is received, and on the other hand, the display controller 101 causes the sign G2 "x" superimposed on the illustration of the microphone to be displayed as an image indicating that a voice input is not received on buttons for "System setting" and "Internet" for which a voice instruction is not received, on the operation screen SC4.

Before such an operation screen SC4 is displayed, the controller 100 switches the operation mode of the image forming apparatus 1 to the voice input possible mode. The receiver 103 performs processing of not receiving a voice instruction indicating voice input prohibited information and receiving a voice instruction other than the voice input prohibited information on the basis of content of the voice instruction input from the voice analyzer 102.

Next, a further embodiment will be described. The controller 100 stores the total numbers of times voice instructions and manual input instructions received by the receiver 103 have been received. Then, when the operation screen as an initial screen is displayed on the display device 473 by the display controller 101, the controller 100 switches the operation mode of the image forming apparatus 1 to a mode with a larger total number of receptions out of the manual input dedicated mode and the voice input possible mode. However, the receiver 103 does not receive a voice instruction and receives only a manual input instruction for an input of the voice input prohibited information in this case as well. In this manner, it is possible to secure security and input accuracy of information as an input target while improving convenience for the user by perform switching to a mode that the user frequently uses at the time of display of the initial screen.

Note that although the case where voice data that is collected by the microphone 22 and converted is analyzed by the voice analyzer 102 in the image forming apparatus 1 has been described above, a speaker that is called a smart speaker, incorporates a microphone therein, and has an artificial intelligence (AI) assistant function may be employed, a user's voice may be collected by the speaker, and the image forming apparatus 1 may use the speaker as a voice input device and receive, by the receiver 103, a voice analysis result from the speaker in a further embodiment.

The present invention is not limited to the configurations of the above 10 embodiments, and various modifications can be made. Also, in regard to the above embodiments, the configurations and the processing illustrated in the embodiments by using FIGS. 1 to 9 are only some embodiments of the present invention, and the present invention is not intended to be limited to the configurations and the processing.

The invention claimed is:

1. An image forming apparatus that includes an image forming device that forms an image on a recording medium, the image forming apparatus comprising:

- a display device;
- an operation device that receives an input of a manual input instruction through a manual operation of a user;
- a voice input device that receives an input of voice from the user; and
- a control device that includes a processor and, through the processor executing a control program, acts as:
  - a display controller that causes the display device to display an operation screen;
  - a receiver that receives a voice instruction based on the voice input to the voice input device and the manual input instruction; and a controller that controls operations of the image forming apparatus and executes a job on the basis of the manual input instruction and the voice instruction received by the receiver, wherein the controller performs switching between a manual input dedicated mode in which only the manual input instruction is received by the receiver and a voice input possible mode in which the voice instruction and the manual input instruction are received by the receiver, and when the operation screen for receiving an input of information of which input through the voice instruction is prohibited in advance is displayed on the display device by the display controller, the controller performs switching to the manual input dedicated mode, wherein, when the operation screen is caused to display both an input item for which the voice instruction is received and an input item for which only the manual input instruction is received, the display controller causes the input item for which only the manual input instruction is received to be displayed with addition of an image or a message indicating that a voice input is not received, the controller performs switching to the voice input possible mode, and the receiver does not receive the voice instruction indicating information of which input through the voice instruction is prohibited in advance and receives the voice instruction indicating information other than the information of which input through the voice instruction is prohibited in advance.

2. The image forming apparatus according to claim 1, wherein, when the controller has performed switching to the manual input dedicated mode, the display controller causes the operation screen to display an image or a message indicating that the voice instruction is not able to be received.

3. The image forming apparatus according to claim 1, wherein the information of which input through the voice instruction is prohibited in advance is private information necessary for authentication or data transmission counterpart information.

4. An image forming apparatus that includes an image forming device that forms an image on a recording medium, the image forming apparatus comprising:

a display device;

an operation device that receives an input of a manual input instruction through a manual operation of a user;

a voice input device that receives an input of voice from the user; and a control device that includes a processor and, through the processor executing a control program, acts as:

a display controller that causes the display device to display an operation screen;

a receiver that receives a voice instruction based on the voice input to the voice input device and the manual input instruction; and a controller that controls operations of the image forming apparatus and executes a job on the basis of the manual input instruction and the voice instruction received by the receiver, wherein the controller performs switching between a manual input dedicated mode in which only the manual input instruction is received by the receiver and a voice input possible mode in which the voice instruction and the manual input instruction are received by the receiver, and when the operation screen for receiving an input of information of which input through the voice instruction is prohibited in advance is displayed on the display device by the display controller, the controller performs switching to the manual input dedicated mode, wherein the controller stores total numbers of times the voice instruction and the manual input instruction have been received by the receiver, and when the operation screen that is an initial screen is displayed on the display device by the display controller, the controller performs switching to a mode with a larger total number of receptions out of the manual input dedicated mode and the voice input possible mode.

5. An image forming apparatus that includes an image forming device that forms an image on a recording medium, the image forming apparatus comprising:

a display device;

an operation device that receives an input of a manual input instruction through a manual operation of a user;

a voice input device that receives an input of voice from the user; and a control device that includes a processor and, through the processor executing a control program, acts as:

a display controller that causes the display device to display an operation screen;

a receiver that receives a voice instruction based on the voice input to the voice input device and the manual input instruction; and a controller that controls operations of the image forming apparatus and executes a job on the basis of the manual input instruction and the voice instruction received by the receiver, wherein the controller performs switching between a manual input dedicated mode in which only the manual input instruction is received by the receiver and a voice input possible mode in which the voice instruction and the manual input instruction are received by the receiver, and when the operation screen for receiving an input of information of which input through the voice instruction is prohibited in advance is displayed on the display device by the display controller, the controller performs switching to the manual input dedicated mode, wherein the image forming apparatus further comprises:

a human sensor that detects a person approaching the image forming apparatus, wherein the controller brings the voice input device into a state where a voice input is possible in a case where an approaching person is detected by the human sensor, and the controller brings the voice input device into an OFF state and into a state where a voice input is not possible when a predefined time elapses after the approaching person is no longer detected by the human sensor.

* * * * *